United States Patent
Garrigues et al.

(10) Patent No.: US 6,710,979 B2
(45) Date of Patent: Mar. 23, 2004

(54) METHOD AND SYSTEM FOR HEAD RETRACTION IN A DATA STORAGE DEVICE

(75) Inventors: Jeffrey M. Garrigues, Perry, UT (US); Craig L. Rupp, Wellsville, UT (US); Klinton D. Washburn, Willard, UT (US)

(73) Assignee: Iomega Corporation, Roy, UT (US)

( * ) Notice: Subject to any disclaimer, the term of this patent is extended or adjusted under 35 U.S.C. 154(b) by 124 days.

(21) Appl. No.: 09/819,012

(22) Filed: Mar. 27, 2001

(65) Prior Publication Data

US 2002/0141115 A1 Oct. 3, 2002

(51) Int. Cl.[7] ................................. G11B 21/22
(52) U.S. Cl. ................................... 360/255.1
(58) Field of Search .................... 360/255.1–255.7, 360/256.1, 256.7

(56) References Cited

U.S. PATENT DOCUMENTS

| | | | |
|---|---|---|---|
| 4,996,617 A | * | 2/1991 | Yaeger et al. |
| 5,638,241 A | | 6/1997 | Sonderegger |
| 5,768,059 A | | 6/1998 | Bishop et al. |
| 5,943,185 A | | 8/1999 | Bracken et al. |
| 5,943,193 A | | 8/1999 | Thayne et al. |
| 6,072,666 A | | 6/2000 | Sonderegger et al. |
| 6,091,587 A | | 7/2000 | Hatch et al. |
| 6,147,841 A | * | 11/2000 | Rao ................ 360/256.2 |
| 6,147,842 A | | 11/2000 | Angellotti |
| 6,148,495 A | | 11/2000 | Ma et al. |

* cited by examiner

Primary Examiner—Allen Cao
(74) Attorney, Agent, or Firm—Dinsmore & Shohl LLP

(57) ABSTRACT

An improved actuation system for a data storage device. In one exemplary embodiment, a head retraction mechanism is movable in a head retraction direction between a head recording position and a head parked position, and an actuator remains engaged with the mechanism for movement during this movement to lessen the risk of damage. A torsional biasing member provides a biasing force on the head retraction arm. A displaceable transmission mechanism is driven by the actuator and moved in a slot in a base from a first position in which the head retraction mechanism is contacted and a second position in which an ejection mechanism is contacted. A load member is integral with the base contacts a friction member on the displaceable transmission mechanism to provide friction for this displaceable movement. The actuator is mounted between a stop member and a biasing member on the base.

4 Claims, 13 Drawing Sheets

METHOD AND SYSTEM FOR HEAD RETRACTION IN A DATA STORAGE DEVICE

TECHNICAL FIELD

The present invention relates generally to a method and system for head retraction and cartridge ejection in a data storage device, and, in one exemplary embodiment, to an engine module for actuating a head retraction mechanism and a cartridge ejection mechanism in a data storage device.

BACKGROUND OF THE INVENTION

Currently, a number of data storage devices exist for the storage of digital data on recording media. For example, magnetic storage devices can be utilized for the storage and/or retrieval of digital data on magnetic recording media, optical storage devices can be utilized for the storage and/or retrieval of digital data on optical recording media, and semiconductor storage devices can be utilized for storage and/or retrieval of digital data on semiconductor recording media. In such devices, the recording media can be permanently mounted or removable. Examples of magnetic data storage systems which accept removable magnetic disk cartridges include the ZIP® drive device, manufactured and marketed by the Iomega Corporation.

In many data storage devices, recording heads are provided to control the reading and/or writing of the data to the media. Such heads can be very sensitive to shock forces and generally should be protected when not in use, such as during transportation or when the recording media is not present. Accordingly, systems have been utilized which retract the head to a safe or protected position during such times.

For example, in a magnetic disk drive device, when a removable magnetic disk is placed in the drive, read/write heads are then permitted to move away from their protected position and toward the read/write position which allows the heads to read and write data to the disk. When the disk is removed, the heads are then retracted to a protected or parked position. A latch can then engage the head actuator to prevent movement of the heads toward the unprotected read/write position.

Various engine systems and components have been utilized for retracting the recording heads and/or initiating the ejection of the cartridge in such data storage devices. In one such system, a D.C. motor, opposed by a spring, engages a pivoting spur gear which engages a head park lever or arm. The motor withdraws the head park lever and allows the heads to read from and/or write to the media. When the direction of the D.C. motor is reversed, the pivoting gear immediately disengages the head park lever, and the spring, acting alone on the head park lever, accelerates the heads to the parked position. Such an uncontrolled retraction of the heads via the spring can cause a large shock to the heads and/or to the media, posing the risk of damage. While damping grease has been utilized to slow down the parking of the heads in such a system, the viscosity of damping grease can vary with temperature, providing inconsistent results. Moreover, the application of damping grease introduces an extra manufacturing process that is expensive and subject to variability in application.

In addition, the manufacture of such head retraction and ejection systems has generally required several components which must be fastened in a small space. As can be understood, the assembly of many pieces of such a system can be time consuming, difficult, expensive, and can require special tools. Moreover, a system having such multiple moving components can suffer from reliability problems in repeatedly performing head retraction movements.

Accordingly, there is a need for a head retraction system for a data storage device which retracts data storage heads in a more controlled manner and with less risk of damage to the recording heads and/or media. Moreover, there is a need for head retraction and cartridge ejection systems which are easier to manufacture and more reliable in operation.

SUMMARY OF THE INVENTION

It is an object of the present invention to obviate one or more of the above-described problems.

It is an object of at least one embodiment of the present invention to provide an improved recording head retraction system.

An object of at least one embodiment of the present invention is to provide a recording head retraction system which retracts recording heads in a controlled manner.

It is an object of at least one embodiment of the present invention to minimize damage to a recording head.

An object of at least one embodiment of the present invention is to provide head retraction and ejection systems which are easier to assemble.

One object of at least one embodiment of the present invention is to provide a head retraction and ejection system which requires fewer separate parts.

It is an object of at least one embodiment of the present invention to provide a head retraction and ejection system which is less prone to failure.

An object of at least one embodiment of the present invention is to provide a head retraction system which requires less space.

The above objects are provided merely as examples, and are not limiting nor do they define the present invention or necessarily apply to every aspect thereof. Additional objects, advantages and other novel features of the invention will be set forth in part in the description that follows and will also become apparent to those skilled in the art upon consideration of the teachings of the invention.

To achieve one or more of these objects, one embodiment of the present invention includes a data storage device, comprising, a recording head, a recording head movement assembly configured to selectively move the recording head, and a head retraction system. The head retraction system comprises a motor actuator, a head retraction arm, and a gear assembly driven by the motor and in contact with the head retraction arm. The head retraction arm is movable in a head loading direction between a head parked position and a head loaded position, and is movable in a head retraction direction between the head loaded position and the head parked position. The head retraction arm is configured to retract the recording head to the head parked position when moved in the head retraction direction. Moreover, the gear assembly is configured to remain in contact with the motor and the head retraction arm during at least part of the movement of the head retraction arm in the head retraction direction, so as to provide controlled movement of the head retraction arm in the head retraction direction.

According to one exemplary embodiment, a displaceable transmission mechanism, such as a gear mechanism for example, is driven by the motor. The transmission mechanism is displaceable in a controlled path between a first position in which the displaceable transmission mechanism contacts a head retraction mechanism (comprising the head retraction arm) such that the head retraction mechanism is movable by the actuator, and a second position in which the displaceable transmission mechanism contacts an ejection mechanism such that the ejection mechanism is movable by the actuator. A load member in contact with the displaceable transmission mechanism provides friction such that the displaceable transmission mechanism may be displaced between the first and second positions under force of the actuator. The load member can be integral with a base upon which the displaceable transmission mechanism is mounted, and the controlled path may be defined by a slot integral with the base. A friction member can be provided on the displaceable transmission mechanism and can contact the load member. The friction member can comprise a friction disk, such as a rubber disk for example, which does not have gears or knurls. The displaceable transmission member can comprise a gear which is rotatably displaceable in the path defined by the slot by the friction between the rotating friction member and the load member which is contacted by the friction member. The motor may be held by using a biasing member which can be integral with the base and movable to an open position so as to provide clearance for the motor to be placed on the base. A torsional biasing member can provide a biasing force in a torsional direction on the head retraction arm, the biasing force acting on the head retraction arm and tending to move the head retraction arm about a pivot point. The torsional biasing member can be mounted partially within the head retraction mechanism and can compress between a stop surface on the head retraction mechanism and a stop surface on the base as the head retraction mechanism moves.

Still other advantages and aspects of various embodiments will become apparent to those skilled in this art from the following description wherein there is shown and described exemplary embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description of exemplary embodiments taken in conjunction with the accompanying drawings in which like reference numerals indicate corresponding structure throughout the figures.

DETAILED DESCRIPTION OF EXEMPLARY EMBODIMENTS

In general, one exemplary embodiment of the present invention relates to a head retraction assembly for retraction of the read/write heads in a data storage device. The head retraction assembly includes a head retraction mechanism movable in a head retraction direction between a head recording position and a head parked position, and an actuator engaged with the head retraction mechanism for movement of the mechanism. The actuator remains engaged with the head retraction mechanism, such a via a gear assembly for example, during at least part of the movement of the head retraction mechanism in the head retraction direction, so as to provide a controlled movement of the head retraction mechanism in the head retraction direction. According to another aspect, the head retraction mechanism is movable about a pivot point, and a torsional biasing member provides a biasing force in a torsional direction. The biasing force acts on the head retraction mechanism to move the mechanism about the pivot point.

One exemplary embodiment of the present invention relates to a head retraction and ejection system for a data storage device. A displaceable transmission mechanism can be driven by the actuator and moved from a first position in which the head retraction mechanism is contacted and a second position in which the ejection mechanism is contacted. A load member can be provided integrally with a base and can contact the displaceable transmission mechanism to provide friction for the displaceable movement of the transmission mechanism between the first and second positions. In one exemplary embodiment, the transmission mechanism can include a friction member connected to a gear member, and the friction member can contact the load member. The base can include a slot for displaceable movement of the transmission mechanism between the first and second positions.

A method for mounting an actuator in a data storage device is also provided. The method comprises providing a base having a stop member and a biasing member connected to the base. The biasing member is moved to an open position to provide clearance for the actuator, and the actuator is inserted between the stop member and the biasing member. The biasing member provides a force to hold the actuator between the stop member and the biasing member.

Figure 1:
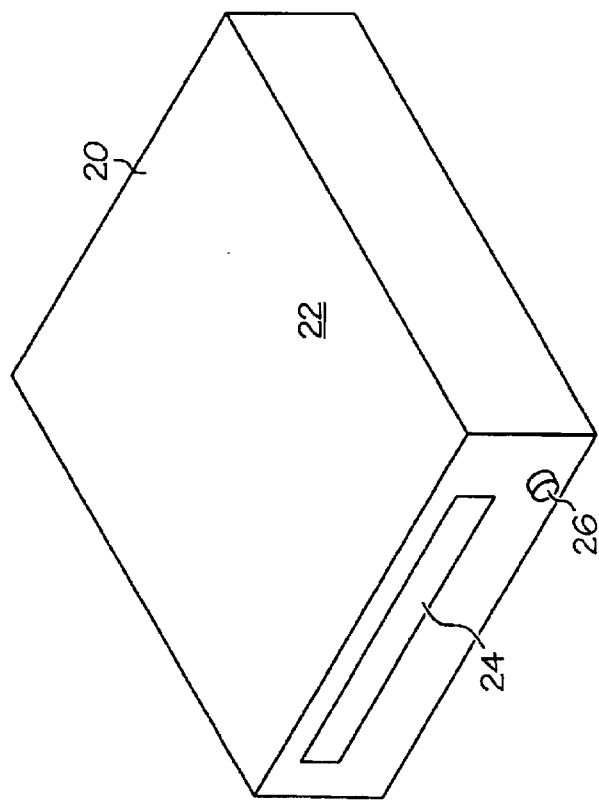
FIG. 1 is a perspective view of an exemplary digital data storage device, which can include a recording head retraction system and/or disk ejection system made in accordance with principles of the present invention.

FIG. 1 is a perspective view of an exemplary data storage device 20. In this example, the data storage device 20 comprises a disk drive having an outer housing 22 which includes an opening 24 configured to receive a disk cartridge. An eject button 26 is also provided as part of the device 20 for automatically ejecting a disk cartridge from the device. The disk drive 20 can be used as a standalone external drive or as an internal drive within a computer or other digital device. While the present invention has application to storage devices which receive removable cartridges, such as the exemplary device shown in FIG. 1, it will be understood that the invention can be applicable to a variety of other data storage devices as well.

Figure 2:
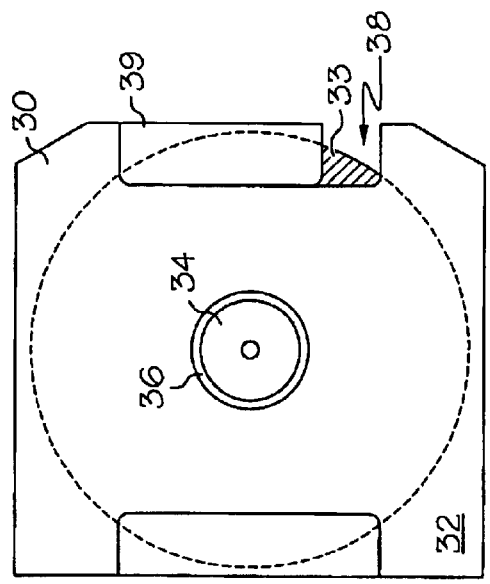
FIG. 2 is a top view of an exemplary disk cartridge which can be utilized with the storage device of FIG. 1.

FIG. 2 illustrates an exemplary disk cartridge 30 which is configured for use with the disk drive device 20 of FIG. 1. The cartridge 30 includes an outer casing 32 and a disk-shaped recording medium 33 is rotatably mounted in the casing via a hub 34 which is accessible through an opening 36 in the casing. A head access opening 38 on the front edge of the disk cartridge 30 provides access to the recording surfaces of the disk 30 by the recording heads of the disk drive device 20. A shutter 39 is provided to cover the head access opening 38 when the disk cartridge 30 is not in use. When the cartridge is inserted into the disk drive 30, the shutter 39 moves to the side exposing the head access opening 38 and thereby providing access by the recording heads of the disk drive 20 to the recording medium 33. In the present example, the casing 32 houses a flexible magnetic recording disk 33, although the recording medium could comprise other suitable recording medium, such as magnetic, optical, or magneto-optical media.

Figure 3:
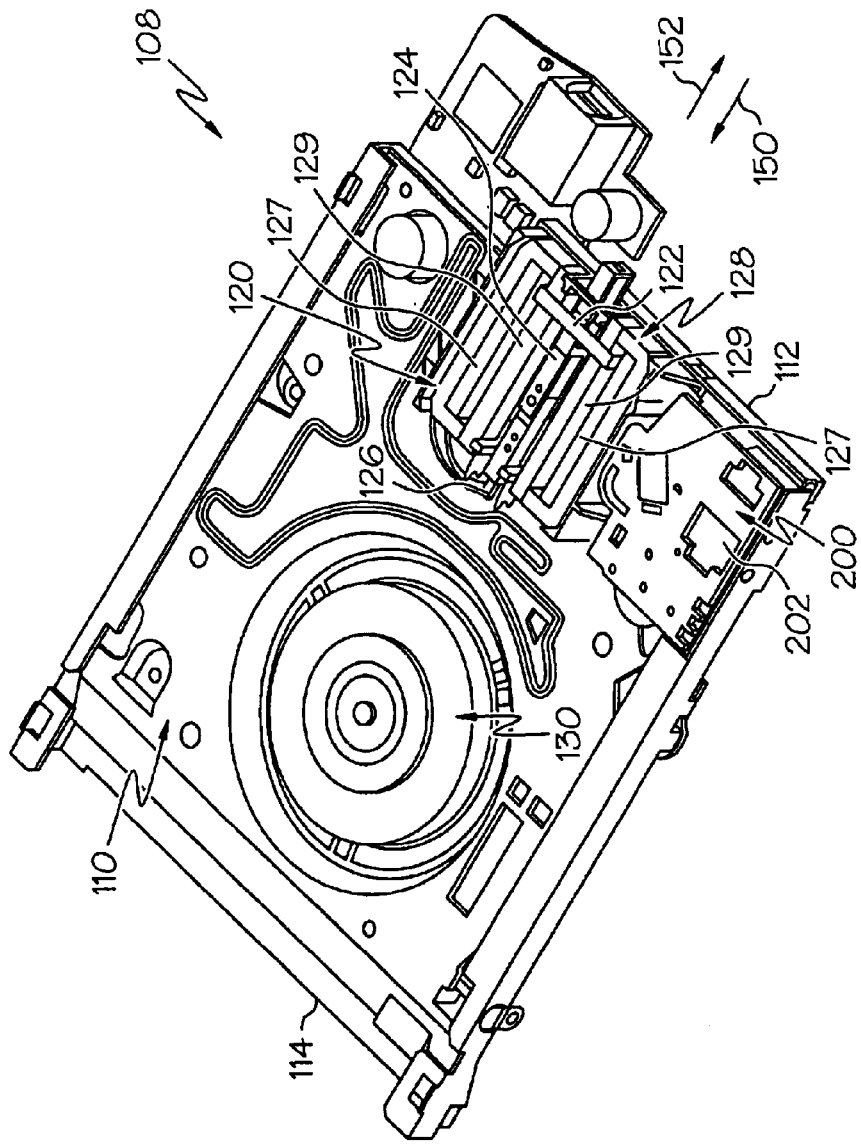
FIG. 3 is a top perspective view of an exemplary chassis assembly which can be utilized within a data storage device, such as that of FIG. 1 and which is made in accordance with principles of the present invention.

FIG. 3 is a top perspective view of an exemplary chassis assembly 108 that can be utilized within a data storage device, such as that of FIG. 1. In this example, a chassis 110 is provided which supports a number of the components of the disk drive device. In particular, provided near the rear 112 of the chassis 110 is a recording head movement assembly 120, which includes a head actuator 122 to which is mounted a head carrying arm 124. Carried at the end of the carrying arm 124 are the read/write heads 126 which can read data from and/or write data to a recording medium. The head actuator 122 is slidingly movable within a guide housing 128 having slide rails 129 and connected magnets 127. In one exemplary embodiment, the head actuator 122 comprises a voice coil which, when energized, is movable along the slide rails 129 of the guide housing 128 due to the field provided by the magnets 127, to thereby move the carrying arm 124 and attached heads 126. A spindle motor 130 is provided on the floor of the chassis 110 near the front end 114 of the chassis.

An actuation system 200 is also provided on the chassis 110. In this embodiment, the actuation system conducts both retraction of the head actuator 122 (and connected carrying arm 124 and heads 126), as well as initiation of the ejection of the disk cartridge. However, as can be understood, aspects of the present invention can be applicable to systems which conduct head retraction only, systems which conduct disk ejection only, and other actuation systems for data storage devices.

Figure 4:
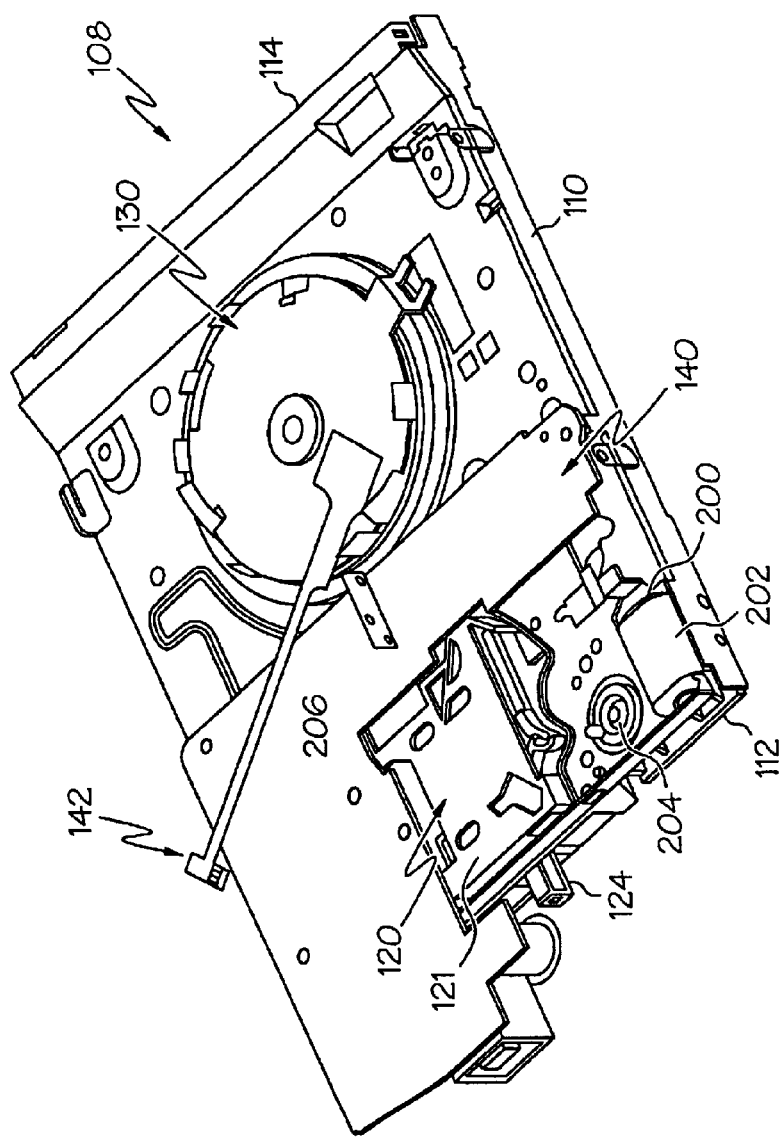
FIG. 4 is a bottom view of the exemplary chassis assembly of FIG. 3.

FIG. 4 is a bottom view of the exemplary chassis assembly of FIG. 3. As shown in this figure, a printed circuit assembly 140 is provided in and is in communication with the actuation system 200, the head movement assembly 120, and the spindle motor 130. For example, a flex circuit 142 can be utilized to provide signals to the spindle motor 130. As also shown in this figure, the actuation system 200 can include an actuator 202 which selectively drives both an ejection mechanism 204 and a retraction mechanism 206, as will be described in further detail below.

The operation of the exemplary data storage device of FIGS. 1–4 will now be described. The disk cartridge 30 is inserted into the drive device 20 via the opening 24. Once fully inserted, the shutter 39 moves to expose the recording medium 33, and the hub 34 is engaged by the motor 130. The retraction mechanism 206 can move the head actuator 122 and attached arm 124 and heads 126 to a head loaded position. In this embodiment, the retraction mechanism 206 is utilized to assist in moving the head actuator 122, attached arm 124, and heads 126 toward the medium 33, because high power can be required to make such a movement using the head actuator 122 alone. Moreover, it may be desirable to separate closely spaced dual heads 126 when in the head parked position of FIG. 3, such as by using head lift tubes, or other suitable separation member, so as to minimize the possibility of the heads become joined together. In this case, the retraction mechanism 206, under power of the motor 202, can be used to overcome the friction of such lift tubes and move the head actuator 122, and attached arm 124 and heads 126 to the head loaded position. However, it should be understood that the head retraction mechanism 206 need not assist in such head loading in all embodiments and that it can be used only for head retraction if desired, with the head actuator 120 or some other actuator conducting head loading.

Once the head loaded position has been reached, the head actuator 122, carrying arm 124 and attached read/write heads 126 can be moved over the recording medium 33, such as by electromagnetic force acting on the head actuator 122 for example. The recording medium 33 is rotated by the spindle motor 130 such that various parts of the medium can be read from and/or written to by the heads 126.

When it is desirable to protect the heads 126 from damage, such as after recording operations are complete or the disk is to be ejected, the retraction mechanism 206 is moved under force of the actuator 202 in a head retraction direction to the head parked position of FIG. 3. The head retraction mechanism 206 contacts the head actuator 122 and, accordingly, moves the head actuator 122 and attached heads 126 to the head parked position, and holds or retains the head actuator in this position by force of a biasing member. The power of the actuator 202 is then switched to the ejection mechanism 204 which is moved, causing the ejection of the disk cartridge 30. Although exemplary components and configurations which can be utilized are shown in FIGS. 1–4, the various inventive aspects, described in further detail below, can be utilized with a variety of systems, components, and data storage devices, such as those described in U.S. Pat. Nos. 6,091,587, 5,943,193, and 6,072,666, the entire disclosures of which are hereby incorporated herein by reference.

Exemplary embodiments and aspects of the actuation system 200 of FIGS. 3–4 will now be described in further detail. In particular, as shown in the exemplary embodiment of FIGS. 5–12, a base 210 is provided to which are secured the various components of the actuation system 200. The base 210 can be formed of any suitably rigid material, such as a plastic material for example. If plastic is utilized, the base 210 can be formed via a molding process, such as an injection molding process for example.

Figure 11:
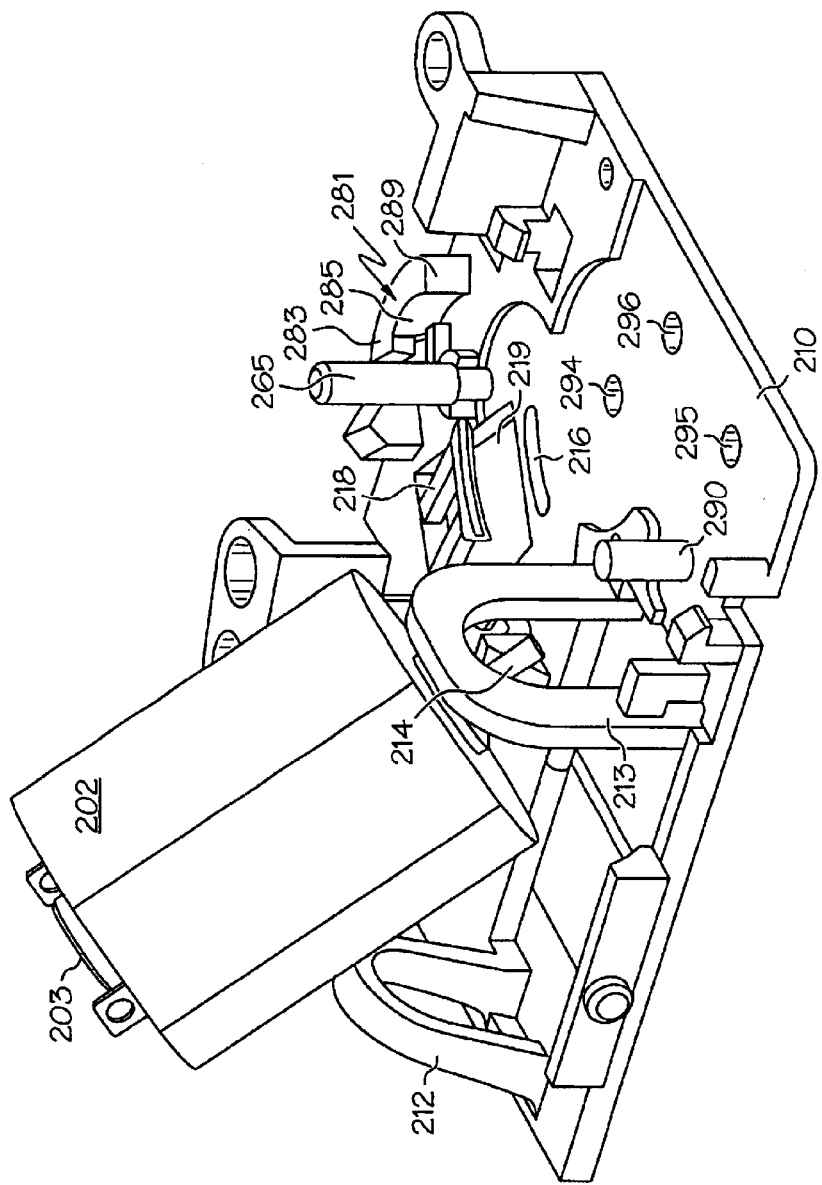
FIG. 11 illustrates the mounting of the motor between the stop member and the biasing member of the exemplary base of FIG. 10 according to principles of the present invention.
Figure 12:
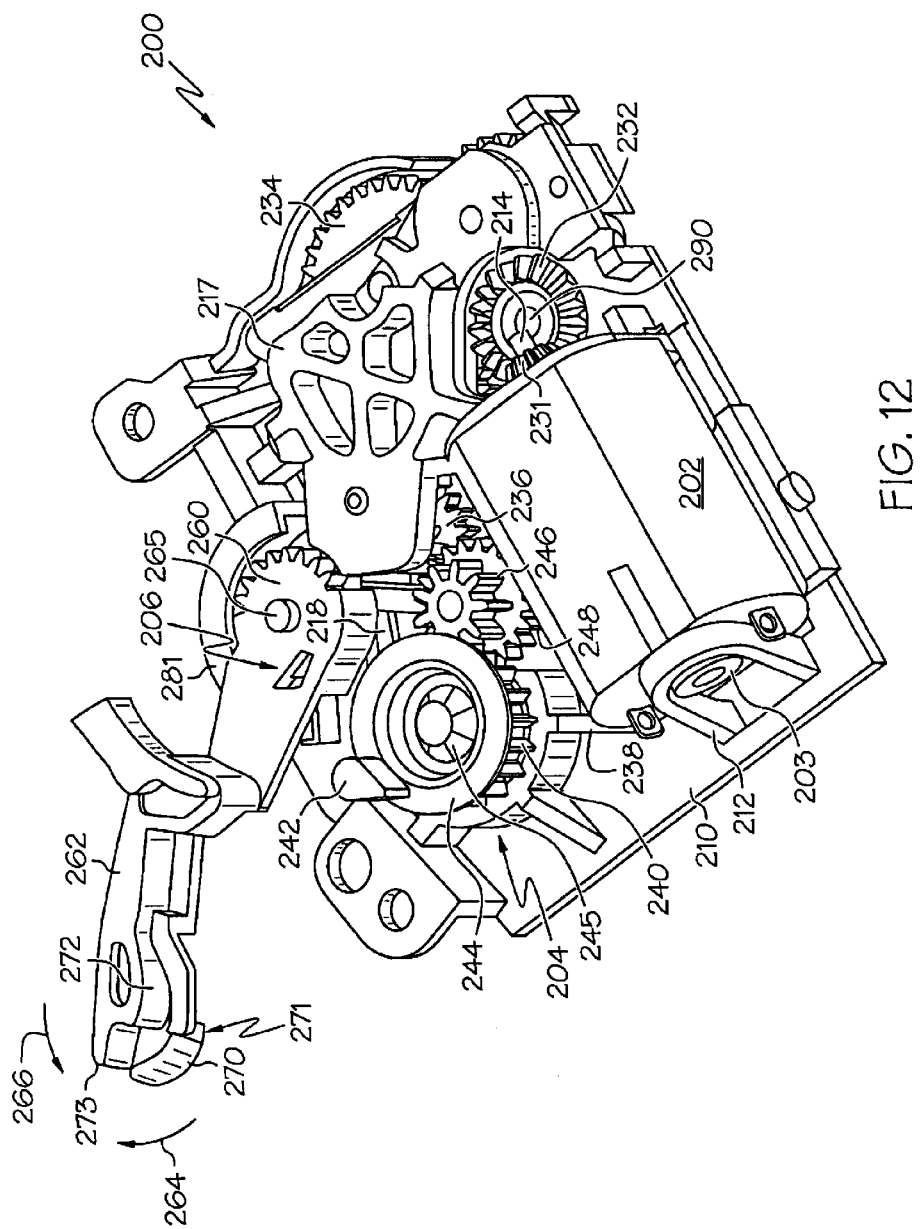
FIG. 12 is a rear perspective view of the exemplary system of FIG. 6.

In this exemplary embodiment, the components of the system 200 are held to the base, either directly or indirectly, for ease of handling and assembly. In particular, the actuator 202, which in this example is an electric motor, is held to the base 210. As best shown in FIGS. 11 and 12, and according to one aspect of the invention, the actuator 202 is held by the force of a biasing member 212 which engages one end of the actuator 202. In this embodiment, the biasing member 212 is integrally formed with the base 210, and is flexible and resilient to allow for clearance for a wide variety of sizes of motors 202. For extra security, the biasing member 212 forms a loop which engages an extension 203 on the end of the motor 202. However, other types of integral and non-integral biasing members could be utilized. The use of the biasing member 212 allows for ease of manufacture and reduces the need for additional fasteners, such as screws for example. However, other inventive aspects described herein will not require the use of such a biasing member for securing of the actuator, and other configurations are possible.

As shown in FIGS. 5–12, the actuator motor 202 provides the mechanical power for movement of the movable members of the actuation system 200. In particular, the motor 202 engages a transmission assembly 230 which then transmits the power to the movable members, in this case the retraction mechanism 206 and the ejection mechanism 204. In this exemplary embodiment, the transmission assembly comprises a series of interconnected gears for transmitting the power of the motor 202 at the desirable speed and torque. In particular, the motor 202 rotates a shaft 214 which in turn rotates a bevel pinion gear 231 mounted on the shaft. The bevel pinion gear 231 in turn engages a bevel gear 232, which engages a spur gear 233. The spur gear 233 engages another spur gear 234 which in turn engages an idler gear 235. In this embodiment, each of the gears 232, 233, and 234 is a compound gear, each having concentric connected small and large diameter gear members (i.e., gear and pinion members) in axial alignment and simultaneously rotatable. In each case, the smaller member (pinion) of one gear engages a larger member (gear) of an adjacent gear, for suitable torque adjustment. However, any suitable number of gears and any suitable type of gears may be utilized without departing from the scope of the invention.

Figure 7:
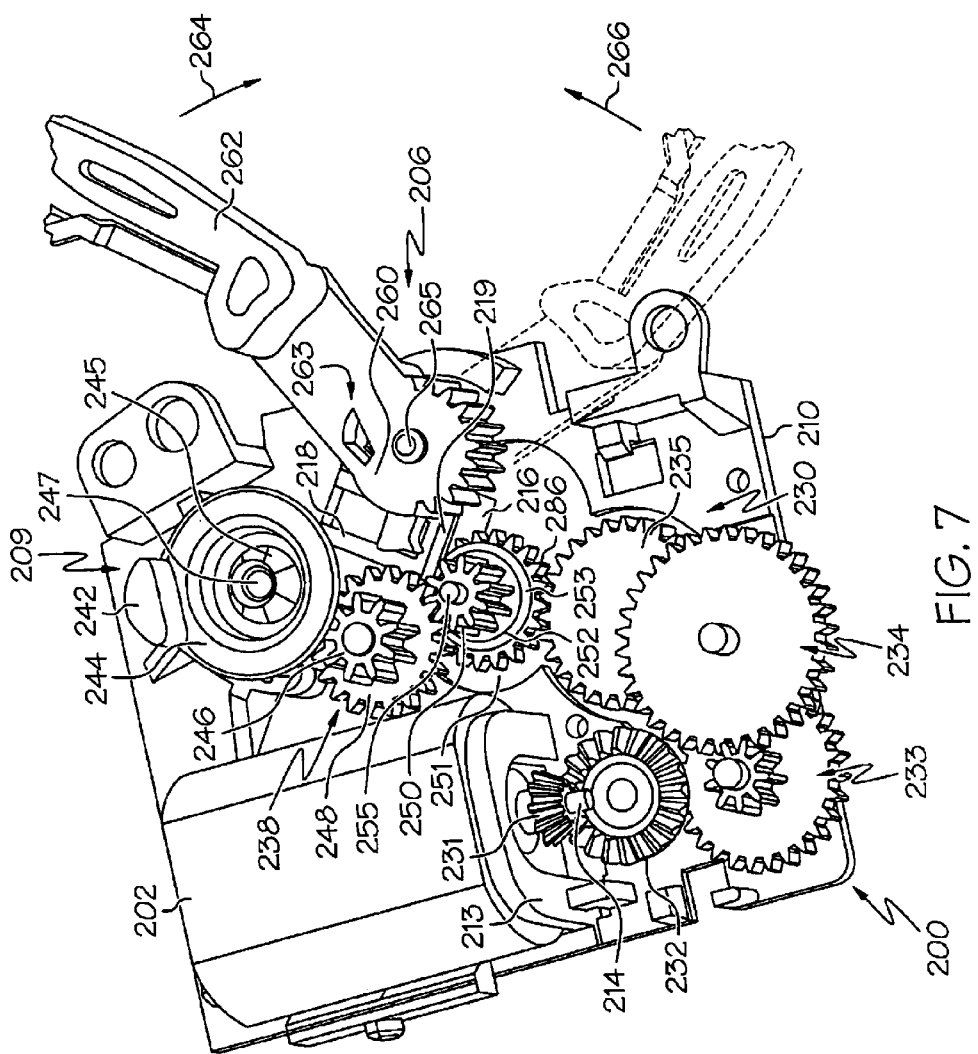
FIG. 7 is a top view of the exemplary system of FIG. 6 showing the retainer plate removed and the displaceable gear mechanism in the ejection position and engaging the ejection mechanism according to principles of the present invention.
Figure 8:
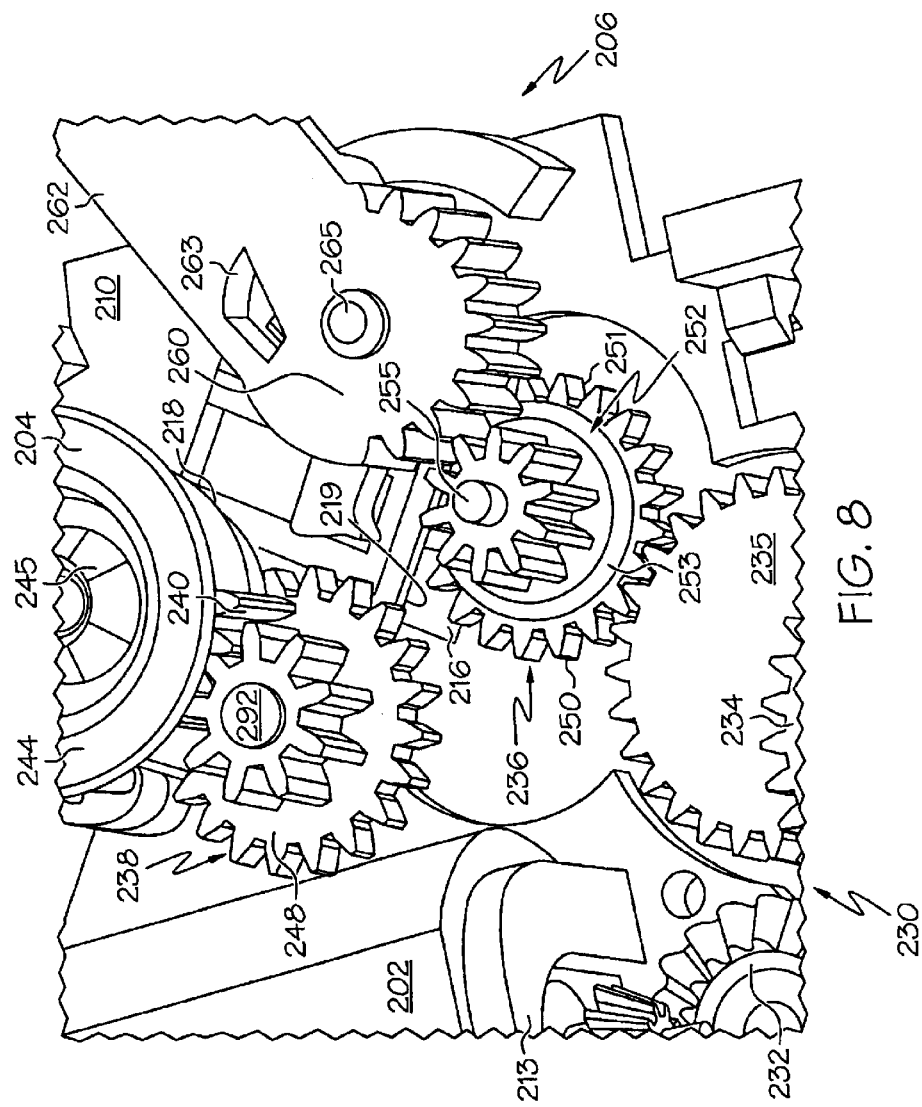
FIG. 8 is an enlarged view of the displaceable gear mechanism of FIG. 7, showing the displaceable gear mechanism in the retraction position and engaging the head retraction arm according to principles of the present invention.
Figure 10:
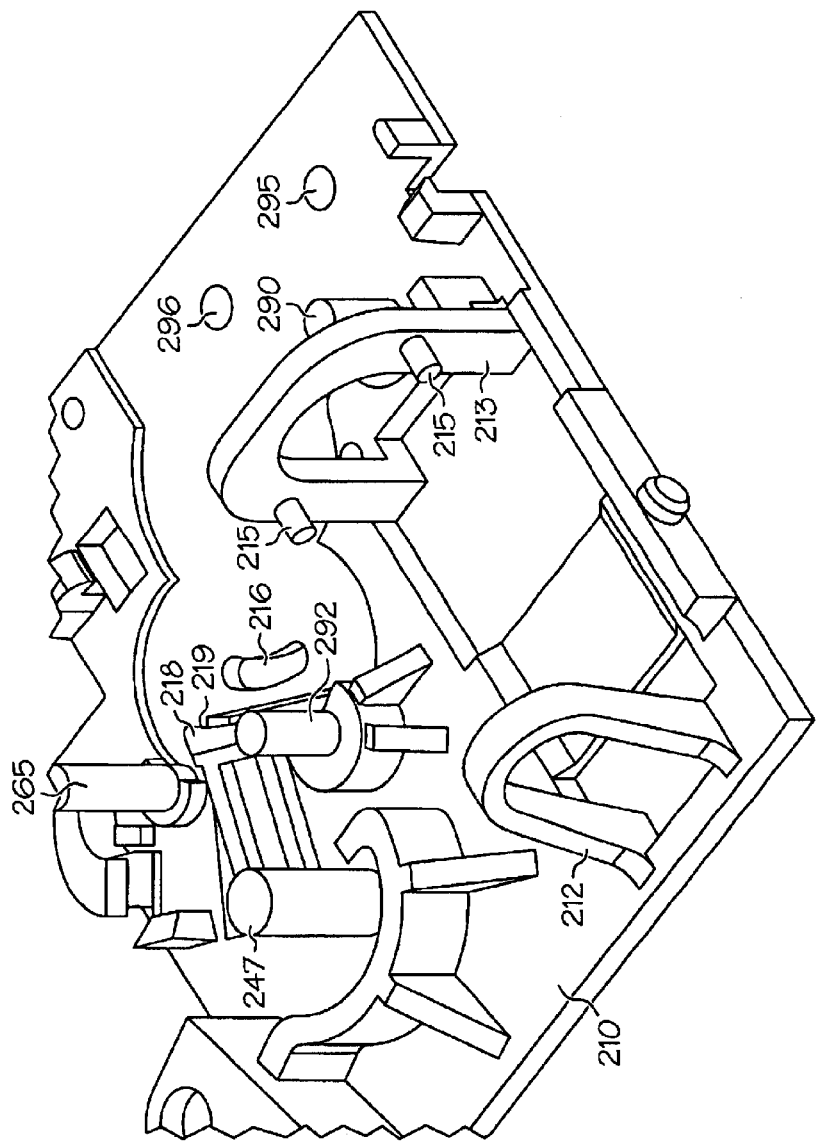
FIG. 10 is a top perspective view of the base of the exemplary system of FIG. 6, illustrating the biasing member and stop member for mounting of the motor actuator and made according to principles of the present invention.

The idler gear 235 then engages a displaceable transmission mechanism, which in this exemplary embodiment is in the form of a displaceable gear 236. The displaceable gear 236 has a lower axle or post, or other portion, which is movable in a slot 216 formed in the base 210, as best shown in FIGS. 7, 8, and 10. The displaceable gear 236 also has a corresponding upper axle or post 255 which is movable in a slot formed on the underside of the retainer plate 217. By being displaceable under the controlled path formed by the slot 216, the displaceable gear 236 can selectively move multiple movable members. In this exemplary embodiment, the movable members comprise the ejection mechanism 204 and the retraction mechanism 206. Because the slot 216 is formed in the base 210, a separate plate or piece is not needed for causing the displacement motion, resulting in manufacturing and performance advantages, such as reduction of parts and/or reduced friction. However, not all aspects of the invention will require a slot to be used and other configurations are possible.

Figure 9:
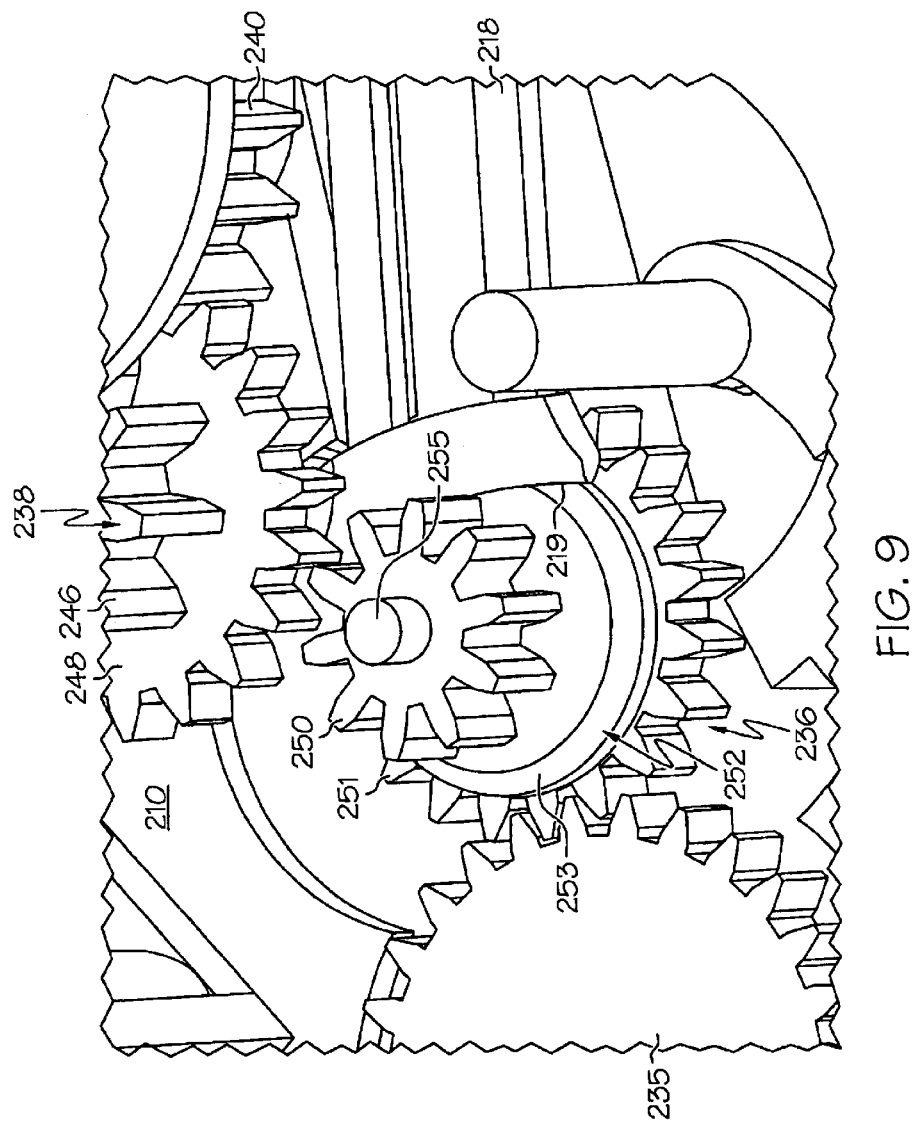
FIG. 9 is an enlarged view of the displaceable gear mechanism of FIG. 7, showing the engagement of the load beam with the friction disk for creating the rotational displacement in accordance with principles of the present invention.

In particular, in the first (i.e., ejection) position of the displaceable gear 236 shown in FIGS. 7 and 9, the displaceable gear 236 can engage another compound spur gear 238 which in turn engages a gear portion 240 on the ejection mechanism 204. Accordingly, in this position, the actuator 202 can turn in a first direction to drive the gear assembly 230 in a first direction to turn the ejection mechanism 204.

Figure 6:
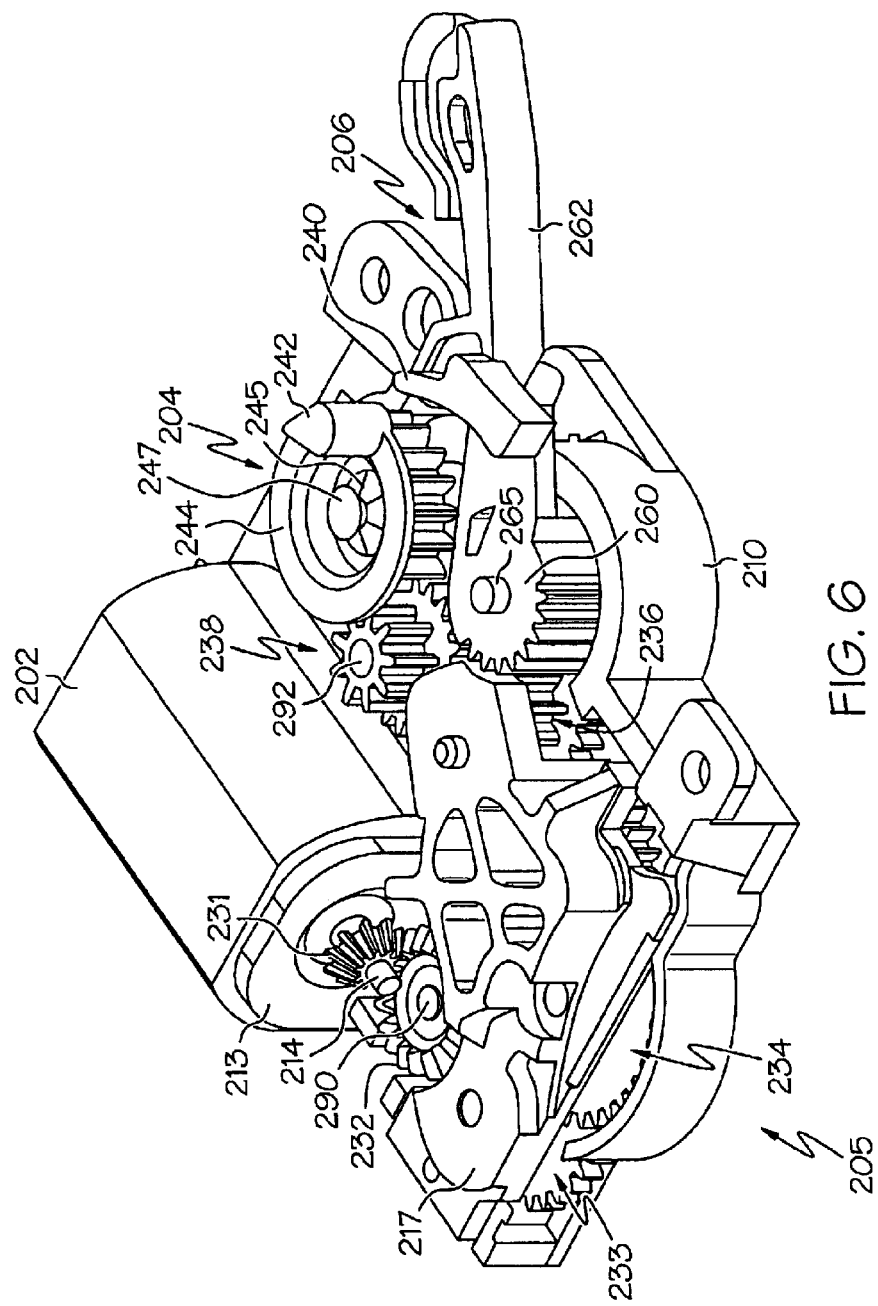
FIG. 6 is an assembled perspective view of the exemplary system of FIG. 5.

If the motor 202 reverses direction and turns in a second direction, however, the gear assembly 230 reverses direction and the displaceable gear 236 moves in the slot 216 over to the second position (i.e., retraction position), shown in FIGS. 6 and 8. In this position, the displaceable gear 236 engages a gear portion 260 of the retraction mechanism 206 for movement of the retraction mechanism.

Movement of the displaceable gear 236 in the slot 216 will now be described. In this exemplary embodiment, the displaceable gear 236 is a compound gear which includes a small gear (pinion) member 250, a large gear member 251, and a friction member 252. The small gear member 250, large gear member 251, and friction member 252 are concentric and in axial alignment. A suitable connection exists between these three components such that they rotate simultaneously. To cause the displaceable gear 236 to move between the first and second positions, a load member 218 is provided. The load member 218 includes a friction surface 219 which abuts a friction surface 253 of the friction member 252 of the displaceable gear 236. In this embodiment, these surfaces 219 and 253 are relatively smooth (i.e., free of knurls and gear teeth). Because of the contact of the surfaces 219 and 253, rotation of the displaceable gear 236 causes friction between the friction member 252 and the friction surface 219, as best shown in FIGS. 7 and 8. In this embodiment, the exemplary friction member 252 comprises a rubber disk, although other members could be utilized. Because the load member contacts the friction member 252 rather than the gear members 250 and 252 directly, the load member need not include gear teeth or knurls, and better control and more friction can be provided. However, not all inventive aspects described herein will require a friction member and other configurations are possible.

Figure 5:
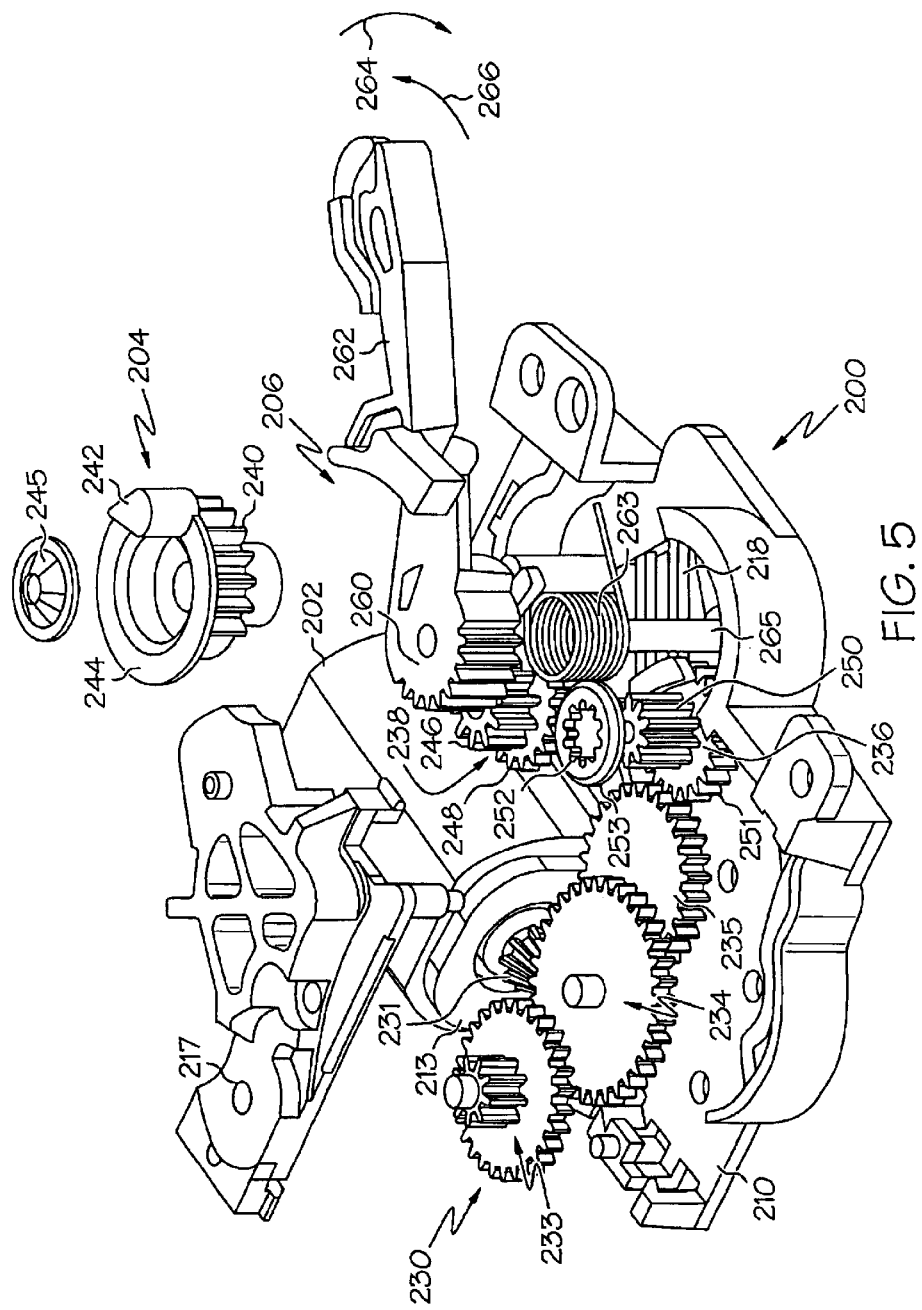
FIG. 5 is an perspective exploded view of an exemplary head retraction and ejection actuation system which can be utilized with the exemplary chassis of FIG. 3 and which is made according to principles of the present invention.

If this rotation of the displaceable gear 236 is in the clockwise direction with respect to FIG. 5, then the friction between the friction member 252 and the friction surface 219 will cause the displaceable gear 236 to move toward the first position (ejection position) of FIG. 9 until the first end of the slot 216 is reached and the spur gear 238 is engaged. Conversely, if the rotation of the displaceable gear 236 is in the counterclockwise direction with respect to FIG. 5, then the friction between the friction member 252 and the friction surface 219 will cause the displaceable gear 236 to move toward the second position (retraction position) until the second end of the slot 216 is reached (by the lower post on the large gear member 251) and the gear portion 260 is engaged. (The upper post 255 simultaneously moves in the slot on the underside of the retainer plate 217.) Accordingly, the displaceable gear 236 moves in the slot 216 (and in the slot on the underside of the retainer plate 217) as the gear 236 rotates until one end of the slot is reached in the direction of the rotation. Upon any reversal of the displaceable gear 236, the displaceable gear 236 moves in the opposite direction in the slot 216 (and in the slot on the retainer plate 217). Accordingly, a reversal of the motor 202 will cause the displaceable gear 236 to move or be displaced within the slot 216 toward the other of the first and the second positions under the force of the friction between the load member 218 and the friction surface 219 as the gear 236 rotates. Accordingly, in this embodiment, the slot 216 provides a controlled path which controls the displacement of the gear 236 between two positions. In this embodiment, the slot 216 is arcuate and the gear 236 is rotatably displaceable (i.e., rolling movable, or displaceable by the power of its own rotation.) However, other slot configurations could be utilized, as could other ways and components to displace the gear 236.

As also shown in the exemplary embodiment FIGS. 5–12, and as best shown in FIGS. 8, 10, and 11, the load member 218 is formed integrally with the base 210. Accordingly, the number of parts can be reduced, as can the difficulty in manufacturing. Moreover, as an integral piece, the load member 218 can be more reliably placed, whereas a separate load member which needs to be fastened to the base 210 can suffer from less accurate placement, resulting in less accurate operability of the system. If the base 210 is a plastic piece, the load member 218 can be formed by using a mold having the desired shape and configuration of the various integrated features and parts. However, not all inventive aspects described herein will require an integral load member and other configurations are possible.

Accordingly, the displaceable gear mechanism 236 can selectively drive either the retraction mechanism 206, via the engagement of the small gear member 250 with the gear portion 260, or the ejection mechanism 204, via the engagement of the small gear member 250 with the large gear member 248 of the spur gear 238 and the subsequent engagement of the small gear member 246 of the spur gear 238 with the gear portion 240 of the ejection mechanism 204.

In this exemplary embodiment, as best shown in FIGS. 5–7, the ejection mechanism 204 is embodied in an ejection crank having the gear portion 240, a finger 242, and a collar 244. The ejection crank 204 is mounted about a post or axis 247 about which it rotates, and a retainer 245 is used to hold the crank on the post. The function of the eject crank 204 is to rotate in response to the rotation of the motor 202 and interact with other components of the eject system of the drive unit 20 to eject a disk cartridge 30 from the disk drive 20. For example, the rotation of the crank 204 can cause the finger 242 and the collar 244 to contact portions of the eject system to initiate the ejection of the cartridge. For instance, the crank 204 can move a drag link forward to cause ejection of the cartridge. The gear portion 240 can have teeth only around a portion of its circumference such that ejection motion will stop after a certain amount of rotation is completed. The gear portion 240 can again be moved into engagement with the gear 238 upon the insertion of a disk cartridge. For example, insertion of the cartridge can move a drag link into engagement with the crank 204. An exemplary configuration for causing the ejection of the disk cartridge in such a manner is disclosed in U.S. Pat. No. 6,072,666, the entire disclosure of which is hereby incorporated by reference herein.

In this exemplary embodiment, the head retraction mechanism 206 includes a gear portion 260, and an arm portion 262. The head retraction gear 260 and head retraction arm 262 are integrally formed, although separate components and other configurations may be utilized. The head retraction arm 262 is rotatably mounted about a post 265 and is biased to the head parked position (shown in FIG. 6) by a biasing member, which comprises a torsional spring 263 in this embodiment. The head retraction mechanism 206 is rotatably movable by the motor 202 about a post 265 through the engagement of the displaceable gear 236 and the gear portion 260. In particular, the head retraction mechanism 206 is movable about the post 265 in a head loading direction 264 (shown in FIG. 7) when the motor 202 rotates in one direction, and in a head retraction direction 266 when the motor rotates in the other direction. The bias of the torsional spring 263 and the camming angle of the displaceable gear mechanism 236 with the gear portion 260 keeps the two engaged as the arm 262 moves in the head retraction direction 266 from the head loaded position, shown in dashed lines in FIG. 7, to the head retracted or parked position, shown in solid lines in FIG. 7. Conversely, an opposite rotation of the motor 202 causes the head retraction mechanism 206 to move in the head loading direction 264 from the head parked position to the head loaded position.

Figure 16:
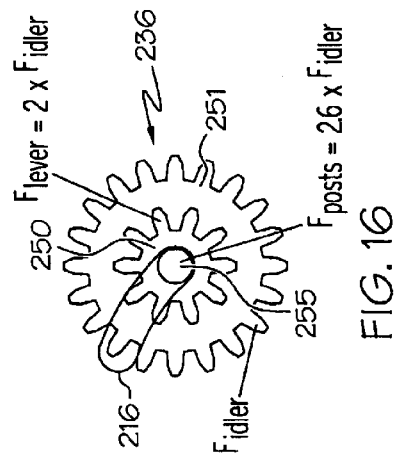
FIG. 16 is a free body diagram illustrating forces acting on the displaceable gear of the exemplary system of FIG. 15 as it is moving in the slot toward the head retraction mechanism.
Figure 17:
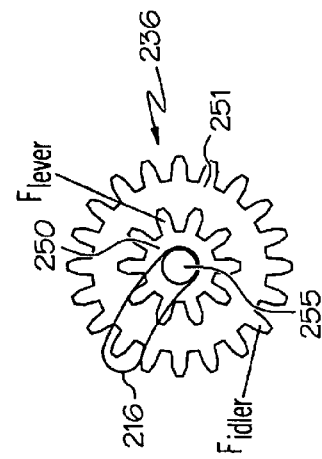
FIG. 17 is a free body diagram illustrating forces acting on the displaceable gear of the exemplary system of FIG. 15 as it is moving in the slot toward the ejection mechanism.
Figure 15:
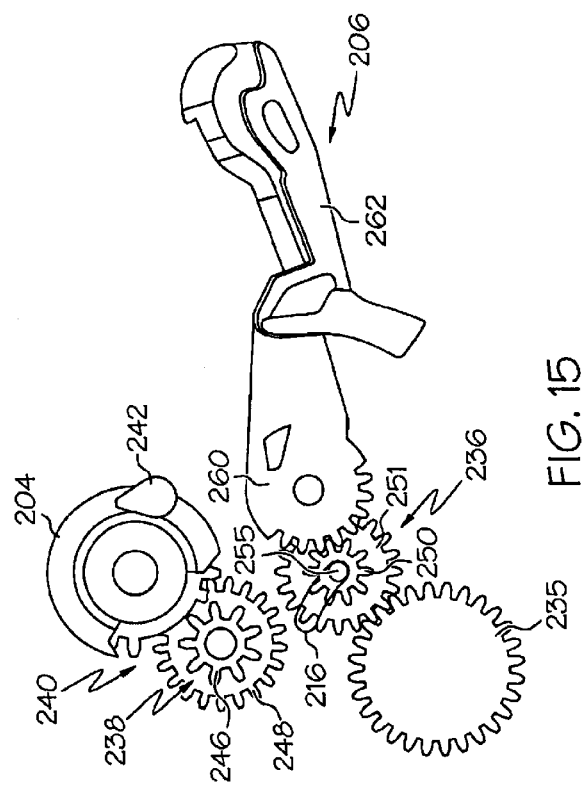
FIG. 15 is a bottom view of a portion of the exemplary actuation system of FIG. 5.

In particular, the bias of the torsional spring 263 causes the movement of the head retraction mechanism 206 in the head retraction direction 266, and the spring responds faster than the motor actuator 202 and remains ahead of the transmission assembly 230, due to the angle between the displaceable gear 236, the head retraction mechanism 206, and the idler gear 235. In particular, FIGS. 15–17 illustrate this exemplary relationship and the forces acting on the displaceable gear 236 due to the relationship. In FIG. 16, the forces are illustrated as the displaceable gear 236 is moved in the slot 216 toward the head retraction mechanism 206 by force of the motor actuator 202 via the gear assembly 230 (and the idler gear 235 in particular). The force $F_{idler}$ is the force acting on the large gear member 251 by the idler gear 235 during this motion, and the force $F_{lever}$ is the force acting on the small gear member (pinion) 250 during this motion. In this exemplary arrangement, due to the pitch circles of the gear members 250 and 251 of the displaceable gear 236, the force $F_{lever}$ is equal to twice the force $F_{idler}$. The resulting force $F_{post}$ on the axle 255 of the displaceable gear assembly 236 is equal to 2.6 times $F_{idler}$. FIG. 17 illustrates these forces as the displaceable gear 236 moves in the opposite direction in the slot 216 and toward the ejection mechanism under power of the actuator 202 applied via the idler gear 235.

Figure 14:
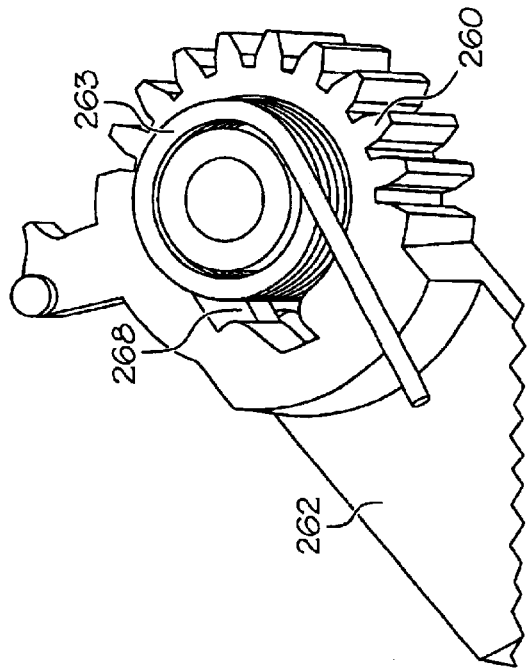
FIGS. 13 and 14 are bottom perspective views of the head retraction arm of the exemplary system of FIG. 6, illustrating the mounting of a torsional biasing member about the pivot post of the head retraction arm in accordance with principles of the present invention.
Figure 13:
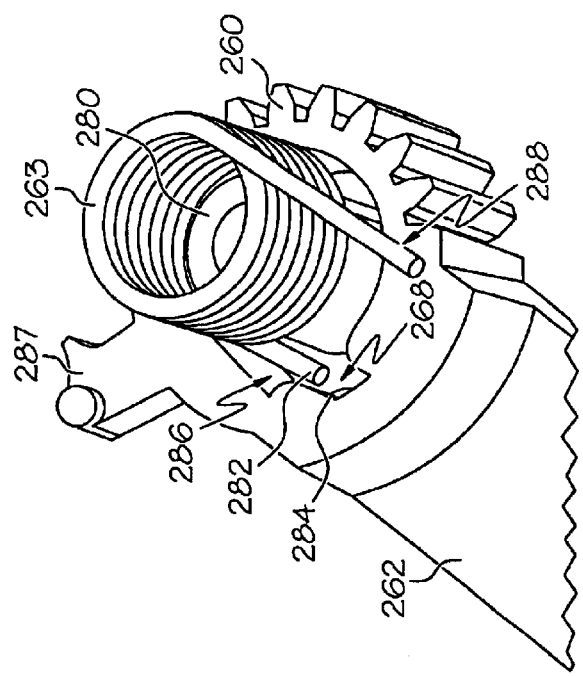

FIGS. 13 and 14 illustrate an exemplary engagement between the torsional spring 263 and the gear portion 260 of the head retraction mechanism 206. In this embodiment, the torsional spring 263 is carried within an opening 268 on one side of the gear portion 260. One end of the torsional spring 263 contacts a stop within the gear portion 260 while an opposite end freely extends from the gear portion 260. When the system 200 is assembled, this opposite end contacts a post or extension on the base 210 such that a torsional force is produced on the arm 262 by the spring 263 when the arm moves in the head loading direction 264, tending to provide a force on the arm 262 in the head retraction direction 266. Space can be saved by using a torsion spring 263 which provides a torsional force, rather than a linear spring which provides a linear force. Moreover, using a torsion spring 263 can allow for a more suitable spring rate and force. Thus, using a torsion spring 263 can have design, manufacturing and/or performance advantages. However, not all aspects of the invention require a torsional biasing member and other configurations are possible.

FIGS. 11–14 show how the torsional spring 263 can be mounted in this exemplary system. In particular, the torsional spring 263 can be placed about a center post 280 of the gear portion 260. Once inserted, the spring 263 can be rotated such that one end 282 of the spring 263 is placed under a lip 284 and hits a hard stop portion 286. The hollow center post 280 can be placed over the post 265 which is integral with the base 210, and the opposite end 288 of the spring 263 can placed under the extension portion 283 of a guide member 281 and against the hard stop 285. This opposite end 288 of the arm 263 is then rotated and the spring is compressed between the hard stops 286 and 285. The tab 287 extending from the gear portion 260 is rotated over the flange 289 of the guide member 281 as the spring compresses between the stops 285 and 286, and then the tab 287 is inserted under the flange 289 of the guide member. The tab 287 can then rotate back under the flange 289 of the guide member 281 until it hits the opposite side of the hard stop 285. Accordingly, the tab 287 is located at one side of the stop 285 while the spring end 288 is located at the opposite end of the stop 285, and the retraction mechanism 206 is held in a biased position by the spring 263, with the tab 287 being held beneath the flange 289 of the guide member 281 and at the stop 285 by the spring. When the motor 202 moves the retraction mechanism 206 against the bias of the spring 263, the tab 287 slides beneath the flange 289, during which movement the spring compresses as its end 288 hits the stop 285 and is held under the extension 283 and its opposite end 282 hits the stop portion 286 and is held under the lip 284.

This movement of the retraction mechanism 206 as guided by the guide member 281 allows the recording head actuator 122 to be moved by the arm 262 between a parked position and a recording position, and vice versa as shown in FIG. 7. In other words, with reference to FIGS. 3–4 and 7, the arm 262 engages the recording head actuator 122 and moves this actuator in the recording direction 150 such that the heads 126 are free to write to the recording media 33. When it is desired to protect the heads 126 from damage, the arm 262 engages the head actuator 122 and moves it in the parking direction 152 until the heads 126 are in a parked and protected position of FIG. 3. Movement of the arm 262 in the retraction direction 266 causes this movement of the actuator 122 in the parking direction 152. Because the motor 202 continues to engage the arm 262 during this head retraction motion 266 (due to the camming angle and the bias of the spring 263), a controlled movement of the arm 262 can be achieved, rather than the uncontrolled movement that can result when a biasing member is allowed to freely move the arm and the sensitive heads 126 moved by the arm. Such an unrestrained movement by a biasing member can cause the heads to be slammed back to a parked position, possibly resulting in damage to the heads. While damping grease can be used to better control a freely moving arm during retraction, biasing grease can have variable viscosity with respect to temperature, and produce variable results. Accordingly, the continued engagement of the motor 202 with the arm 262 via the system during the retraction motion creates a resistance to the biasing member and provides better controlled motion and less risk of head damage during retraction. However, not all aspects of the invention require this continued engagement and other configurations are possible.

Movement of the arm 262 in the retraction direction 266 ceases once the displaceable gear 236 reaches the end of the gear portion 260. At this point, the displaceable gear 236 will disengage the gear portion 260. Conversely, movement of the arm 262 in the loading direction 264 ceases once the arm reaches a predetermined position and the motor 202 and friction in the gear assembly 230 holds the arm at that position. One exemplary method for determining when to stop the motor 202 is by counting the commutations of the motor as an approximation of the revolutions that the motor has completed, and subsequently as an approximation of the distance that the arm 262 has traveled. Because it is known approximately how far the motor 202 travels with each commutation, the distance that the arm 262 moves is also known, and the motor 202 can be stopped or reduced in power once a certain number of commutations have been counted in the direction corresponding to the motion which moves the arm 262 and the head movement assembly 120 to the head loaded position.

In one exemplary embodiment, the voltage applied to the motor 202 can be reduced after a given number of commutations, once it is known that the arm 262 will be close to its loaded position. For example, the voltage can be reduced to about 55% of its original value (the value applied while the arm 262 is moving toward the head loaded position). For instance, if about 5 volts was applied, the voltage could be reduced to about 2.75 volts after the predetermined number of commutations (e.g., 89 commutations which could take about 0.3 seconds to complete). The voltage could then be reduced further, such as in a linear fashion, to a predetermined small holding voltage, which helps to maintain the motor 202 and the arm 262 at a given position. For instance, the voltage could be reduced linearly over a time period of about 0.5 seconds (or over a corresponding number of commutations) from the value of about 2.75 volts to a value of about 0.2 volts, such as by using a ramped waveform. It has been found that such a motor control voltage can help to further move the arm 262 if it has not quite reached the fully loaded position. Moreover, if the arm 262 has reached the fully loaded position and has reached a hard stop, as defined by the cover or shroud 121, this ramped waveform will also allow the gear assembly 230 to slowly unwind any stored mechanical elastic energy caused by reaching the hard stop, rather than to allow the gear assembly 230 to rebound quickly and cause the arm 262 to be moved back from the head loaded position, possibly resulting in recording inaccuracy and/or failure. In one exemplary embodiment, an initial pulse of voltage can be applied to initially release the heads. For example, a pulse of about 5 volts could be applied for about 32 commutations and then the voltage reduced to zero. A subsequent 5 volt pulse and ramped down waveform such as described above, could then be applied.

Accordingly, the actuation system 200 can cause the selective movement of movable members. In this example, the movable members are the head retraction mechanism 206 and the ejection mechanism 204. With reference to FIGS. 3–9 and 12, when it is desirable to allow the heads 126 to read from and/or write to the media, the motor 202 rotates in the second direction and moves the displaceable gear mechanism 236 toward its retraction position such that it engages the gear portion 260 of the head retraction mechanism 206 Continued motion of the motor 202 in this direction causes motion of the head retraction arm 262 in the loading direction 264 moving the head actuator 122 in the recording direction 150 until the heads 126 reach the fully loaded position, at which the head actuator 122 can then position the heads to the desired radial read/write position along the recording disk. In particular, as shown in FIG. 12, a claw 270 on the end of the arm 262 can engage a pin which extends from the head actuator 122 to move the actuator in the head loading direction. Once the pin has reached the stepped end 271 of the claw 270, the pin is free of the claw and the carrying arm 124 has reached the fully loaded position. The heads 126 can then read and/or write to the media and be moved by the head actuator 122 during this read/write procedure.

When it is desired to retract the heads 126 to a parked or protected position, the motor 202 can reverse and begin to move in the first direction causing movement of the head retraction mechanism 206 in the head retraction direction 266. In particular, during motion of the arm 262 in this direction, the curved portion 272 of the arm 262 contacts the pin on the head actuator 122 and moves the head actuator 122 and attached carrying arm 124 and heads 126 to the parked position (shown in FIG. 3). At this position, the catch surface 273 of the arm 262 engages the pin and retains the actuator 122 at this position. The motor remains engaged with the head retraction mechanism 206 during this retraction movement via the gear assembly 230. In this embodiment, the camming angle between the displaceable gear 236 and the retraction mechanism 206, as well as the bias of the biasing member 263 keeps the retraction mechanism 206 engaged with the motor 202 during a substantial portion of the head retraction movement 266, which can be a majority of this or all of this movement. This allows for controlled motion of the heads 126 in the parking direction 152, and reduces the risk of head damage.

When the displaceable gear 236 disengages the gear portion 260, if it is desirable to eject the disk, the motor 202 continues to rotate in the first direction. This continued rotation of the motor 202 causes the displaceable gear 236 to begin to move or displace in a controlled path as defined by the slot 216 (and by the slot in the retainer plate 217). The friction between the load member 218 and the friction disk 252, as well as the engagement of the axle 255 in the slot causes this rotatable displacement of the gear 236 under the power of the idler gear 235 driven by the motor 202. This displacement continues until the displaceable gear 236 reaches its ejection position and engages the gear 238 which then begins to rotate. Rotation of the gear 238 causes corresponding rotation of the ejection mechanism 204 which can initiate the ejection of the disk from the drive. Motion of the motor 202 can then cease. Once it is desirable to move the heads 126 to the recording position again, the motor can move in the second direction again, causing the displaceable gear 236 to move in the slot 216 and to engage the head retraction mechanism 206 to cause movement of the arm 262 in the head loading direction 264, and the process can repeat. A controller, processor, or other circuit can be utilized for causing the desired rotation of the motor 202 and the resulting retraction or ejection movements.

While the slots described can be utilized rather than a separate plate or part for moving the gear 236, other alternatives are possible for minimizing parts. For example, the posts 255 on the top and bottom of the gear 236 can move between capture members or guides which extend from the base 210 rather than in a slot recessed therein. Preferably, these guides are integral with the base 210 and extend therefrom. The gear 236 can then be displaced between guides under the rolling contact of the gear with the load member 218. In this alternative, the force provided by the driving gear (e.g., idler gear 235 or other suitable driving gear) is opposed by the load member 218, and gear stops its rotational displacement once it hits the guides and/or the respective gears 260 and 238. In this case, the ends of the controlled path for the gear 236 are defined by the guides which extend from the base 210, rather than by the ends of the slots.

Assembly of the exemplary system 200 will now be described with reference to FIGS. 5–14. The bevel pinion gear 231 can be applied to the motor shaft 214 and the motor wires can be attached to the motor 202. The bevel gear 232 can then be placed on a shaft 290 on the base 210 and the motor 202 can then be placed between the biasing member 212 and a flange or stop 213 on the base 210. FIGS. 10–12 illustrate an exemplary method and configuration for placement of the motor 202 in this manner. In particular, posts 215 on the flange 213 can engage holes or recesses in the motor 202. The biasing member 212 can then be moved to an open or clearance position, against the force of its bias, allowing room to place the motor 202. The biasing member 212 can then be released or otherwise placed against the motor 202. In this example, the biasing member 212 engages an extension 203 on the motor 202. Such a use of a biasing member 212 can reduce the number of fasteners and parts needed for holding the motor 202 to the assembly, and can reduce manufacturing time and complexity. Moreover, variability in length tolerances of motors can be accommodated. However, other aspects of the invention will not require such a biasing member, and other configurations are possible.

The gear 238 can then be placed over a post 292 on the base 210 and the ejection mechanism 204 can be placed over post 247. The retainer 245 can then be placed to hold these components. The torsion spring 263 can then be placed in the gear portion 260 of the retraction mechanism 206 and the mechanism 206 can be placed about the post 265 as described above, such that the post 265 serves as a central axis for both the gear portion 260 and the torsion spring 263. The rubber friction disk 252 is then installed over the member 250 of the displaceable gear 236, and the post 255 of the gear 236 is installed in the slot 216 under the load member 218, such that the load member 218 contacts the friction disk 252. The gears 235, 233 and 234 are then placed on the base 210, such as by placing their posts in corresponding openings 294, 295, and 296 in the base 210 or otherwise suitable placing these gears. As can be seen, these gears can be integral with their mounting posts, and the corresponding openings can be integral with the base plate 210, so as to reduce the number of parts required and to make the manufacturing process more simple and efficient. A retainer plate 217 can then be snapped into engagement with the base 210 to hold these gears and components.

Although particular friction members, load members, displaceable transmission mechanisms, biasing members, configurations for mounting, and configurations for controlled retraction have been described herein, it should be understood that any of a variety of such members, mechanisms, components and configurations can be utilized without departing from the aspects of the invention. The drawings and descriptions are only to be regarded as examples and not as restrictive. For example, while a displaceable gear mechanism is shown other displaceable transmission mechanisms could be utilized, such as displaceable linking mechanisms and the like. Moreover, while a gear assembly is utilized for engaging the retraction mechanism during retraction, other linking components, such as couplers and the like, could be utilized for maintaining engagement and controlled motion. Likewise, although an integral plastic biasing mechanism is shown for holding the actuator, other biasing members such as springs and the like could be utilized. Similarly, although a rubber friction disk is illustrated for use as a friction member, other friction members with a suitable coefficient of friction, such as non-toothed friction surfaces for example, could be utilized.

Also, it should be reiterated that not all aspects of the invention need to be used in combination with all other aspects, and a variety of combinations of such aspects are possible. Moreover, the invention has applicability to a variety of data storage devices, systems, and sub-systems.

Thus, the foregoing descriptions of the exemplary embodiments of the invention have been presented for purposes of illustration and description only. They are not intended to be exhaustive or to limit the invention to the precise forms disclosed, and modifications and variations are possible and contemplated in light of the above teachings. While a number of exemplary and alternate embodiments, methods, systems, configurations, and potential applications have been described, it should be understood that many variations and alternatives could be utilized without departing from the scope of the invention.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A head retraction and ejection system for a data storage device, comprising:

an actuator;

a displaceable gear mechanism comprising a gear member and a friction member engaged with the gear member, wherein the gear member and the friction member are configured to be simultaneously rotated by the actuator, wherein the displaceable gear mechanism is rotatably displaceable by the actuator in a controlled path between a first position in which the gear engages a head retraction mechanism and a second position in which the gear engages a cartridge ejection mechanism; and a load member, wherein the load member is in contact with the friction member of the displaceable gear mechanism to allow the displaceable gear mechanism to move between the first and second positions when rotated by the actuator.

2. The system as recited in claim 1, wherein the friction member comprises a friction disk free of teeth.

3. The system as recited in claim 2, wherein the friction disk comprises a rubber material.

4. The system as recited in claim 1, wherein the friction member comprises a smooth friction surface and wherein the load member comprises a smooth friction surface.

* * * * *